United States Patent [19]

Greaves

[11] Patent Number: 4,776,827

[45] Date of Patent: Oct. 11, 1988

[54] TEMPERATURE SENSING SYSTEM USING A PHOSPHOR HAVING A TEMPERATURE-DEPENDENT LUMINESCENT DECAY TIME

[75] Inventor: Martin P. Greaves, London, England

[73] Assignee: The General Electric Company p.l.c., England

[21] Appl. No.: 89,607

[22] Filed: Aug. 26, 1987

[30] Foreign Application Priority Data

Sep. 1, 1986 [GB] United Kingdom ............... 8621077

[51] Int. Cl.[4] ..................... G01K 11/00; G01N 21/64
[52] U.S. Cl. .................................. 374/161; 250/461.1; 374/131
[58] Field of Search ............... 374/161, 162, 103, 152; 250/461.1

[56] References Cited

U.S. PATENT DOCUMENTS

| | | | |
|---|---|---|---|
| 3,427,581 | 2/1969 | Hartman | 364/834 X |
| 4,223,226 | 9/1980 | Quick et al. | 374/159 X |
| 4,560,286 | 12/1985 | Wickersheim | 374/131 |
| 4,652,143 | 3/1987 | Wickersheim et al. | 374/161 |
| 4,708,494 | 11/1987 | Kleinerman | 374/161 |

OTHER PUBLICATIONS

"Fluorescent Decay Thermometer with Biological Applns", Sholes & Small, Rev. Sci. Instrum., 51(7), Jul. 1980, pp. 882–884.

Primary Examiner—Daniel M. Yasich
Attorney, Agent, or Firm—Kirschstein, Kirschstein, Ottinger & Israel

[57] ABSTRACT

A temperature sensing and measuring system in which a luminescent material is excited using a light source. The luminescence emitted decays with time, the decay time being dependent on temperature. Thus by monitoring the excitation and luminescence transmitted to and from the material via an optical fibre, the decay time constant and thus the temperature can be determined.

13 Claims, 3 Drawing Sheets

TEMPERATURE SENSING SYSTEM USING A PHOSPHOR HAVING A TEMPERATURE-DEPENDENT LUMINESCENT DECAY TIME

BACKGROUND OF THE INVENTION

FIELD OF THE INVENTION

This invention relates to a system for sensing and measuring temperatures by means of an optical technique, utilising a phosphor having a luminescent decay time which is dependent upon the temperature of the phosphor.

SUMMARY OF THE INVENTION

According to the invention a temperature sensing and measuring system comprises at least one probe containing a phosphor having a luminescent decay time which is dependent upon the temperature of the phosphor; means for producing a pulse of radiation having a wavelength capable of exciting the phosphor to luminescence; one or more optical fibres for directing said radiation on to the phosphor and for directing the luminescent emission from the phosphor to a monitoring device capable of deriving a first electrical signal which varies with the degree of luminescence; means responsive to the pulse of radiation for deriving a second electrical signal having a value dependent upon the intensity of the pulse and for storing such signal; means for integrating the first signal produced by the monitoring device over a predetermined time period for producing a third electrical signal having a value representing said integrated first signal, and means for dividing the second signal by the third signal and for providing an output signal which is dependent on the result thereof.

We have found that the output signal, which may be termed the decay time constant, is a function of the temperature of the phosphor.

Thus the exponentially decaying luminescence is of the form $$I(t) = I_o e^{-kt}$$

where: k is the decay time constant, $I_o$ is the decay signal amplitude at the start of the measurement (time t=0) and t is time.

If we integrate this we get $$\int_0^T I\,dt = I_o \int_0^T e^{-kt} dt$$

$$= \frac{-I_o e^{-kt}}{k} + c$$

This is equal to zero at time t=0, therefore $C = I_o/k$.

Because $e^{-kt}$ decays exponentially to zero, the final value of Idt is $I_o/k$.

If we divide $I_o$ by this we get k.

$$\frac{I_o}{Idt} = \frac{I_o}{I_o/k} = k$$

The signal processing can be implemented using readily available devices.

It will be appreciated that the phosphor employed must have a decay time which varies significantly over the temperature range of interest.

Over a temperature range from about −70° C. to +200° C. a suitable phosphor is aluminum oxide powder doped with chromium ($Al_2O_3$:$Cr^{3+}$) commonly known as ruby, the decay time varying from about 3.5 mS at 0° C. to about 1 mS at 200° C.

Conveniently a xenon flash lamp is used as the excitation means, this having a short arc length producing a highly intense light flash, the pulse energy for producing the light flash conveniently being stored in a capacitor or capacitor bank.

Alternatively, the excitation source may be a light-emitting diode.

The same optical fibre or fibres may be used for conveying the light pulse to the phosphor and for carrying the emission from the phosphor.

The invention may be used, for example, for monitoring the temperature within high power electricity generators. For such a purpose the probe may possibly consist of a metal tube, for example of brass, closed at one end and having an optical fibre sealed into the opposite end, the phosphor being located within the tube between the end of the fibre and the closed end of the tube. However other forms of probe may be used, such as tubes formed from glass, plastics or ceramic material.

A number of probes and associated optical fibres may be used to monitor the temperature at different positions within the generator. A single flash lamp or separate light-emitting diodes may be used to launch light simultaneously into the different fibres.

However although the invention is especially suitable for use in monitoring the temperature within electrical generators, it will be appreciated that it has a number of different applications, where the remote measurement of temperature is required to be carried out.

BRIEF DESCRIPTION OF THE DRAWINGS

One temperature measuring system in accordance with the invention will now be described, by way of example only, with reference to FIGS. 1, 2 and 3 of the accompanying schematic drawing, in which.

DETAILED DESCRIPTION OF THE PREFERRED EMBODIMENTS

Figure 1:
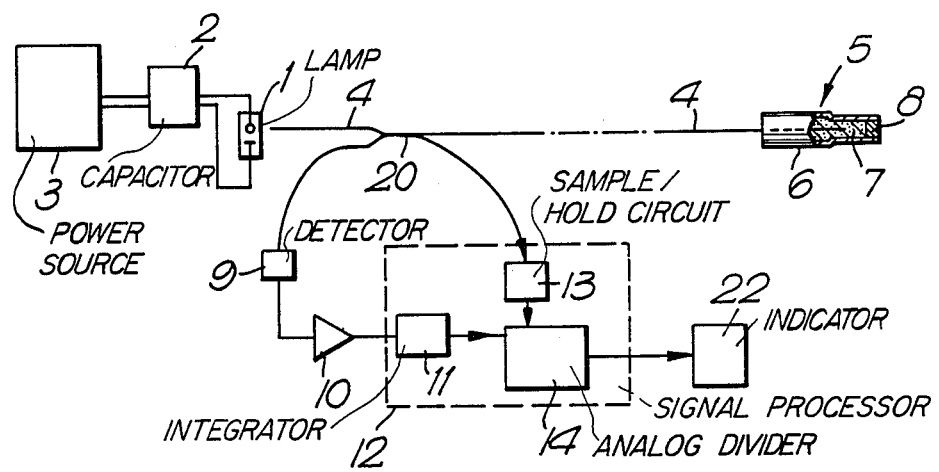
FIG. 1 represents a diagrammatic representation of the system.

Referring first to FIG. 1, the apparatus comprises a short arc length xenon flash lamp 1 arranged to be operated periodically by means of a triggering circuit of any convenient form, a reservoir capacitor or capacitor bank 2, charged from an appropriate power source 3, providing the energy necessary for producing a series of high intensity light pulses from the lamp.

An optical fibre 4 conveys the light pulses to a probe 5 in the form of a short brass tube 6 containing a quantity of powdered ruby phosphor 7, which has a luminescent decay time which varies with temperature, the fibre being sealed in a gas- and liquid-tight manner into one end of the tube, the opposite end of which is closed by a plug 8. The end of the fibre within the tube 6 is in contact with the phosphor powder.

Following the energisation of the phosphor 7 by a light pulse, the phosphor luminesces in an exponentially decaying manner, the light from the phosphor travelling back along the fibre 4, and passing via a coupler 20 to a silicon pin diode detector 9 which converts it into a first electrical signal. This signal is then amplified, by means of an amplifier 10, and fed to an integrator 11 in a signal processor 12. A second electrical signal, derived from the initial light pulse fed along the fibre 4 to the probe 5, is fed to a sample/hold circuit 13 also within the signal processor 12.

The output of the integrator 11, in the form of a third electrical signal, is then fed, together with the second signal from the stored sample/hold circuit 13, to an analogue divider 14 which divides the second signal by the third, giving an output signal which is representative of the temperature of the phosphor within the probe 5 and hence of the environment within which the probe is located, the signal being fed to a suitable indicator 22.

Figure 2:
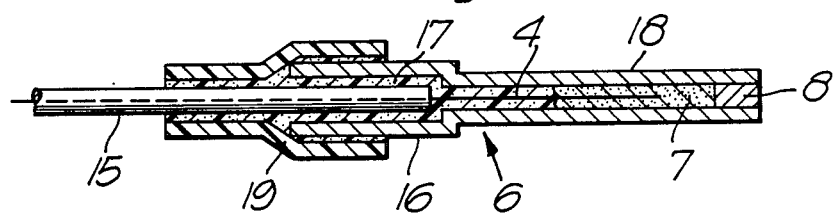
FIG. 2 shows one construction of a probe used in the system.

The system is conveniently employed for monitoring the temperature within a high voltage electrical generator, and for this purpose the fibre 4 may be coated with one or more layers of a protective plastic or other material to form a rugged cable, gas tight connectors of any convenient kind enabling connections to be made through the outer wall of the generator. One probe for such a purpose may, for example, be constructed as illustrated in FIG. 2, the fibre 4, with a protective coating 15, being sealed within the wider end 16 of a stepped brass tube 6 by means of a vinyl adhesive 17, with the uncoated fibre projecting into the narrower end 18 of the tube. A high temperature heat-shrinkable sleeve 19, coated internally with the same adhesive, is shrunk over the part of the region of the coated fibre 4 entering the tube 6 and also over the adjacent part of the tube to provide an effective seal, the phosphor powder 7 then being introduced into the narrower end of the tube 6 to contact the fibre end. The plug 8, conveniently of copper, is then forced into the narrower end 18 of the tube 6 to close it and soldered in position.

Figure 3:
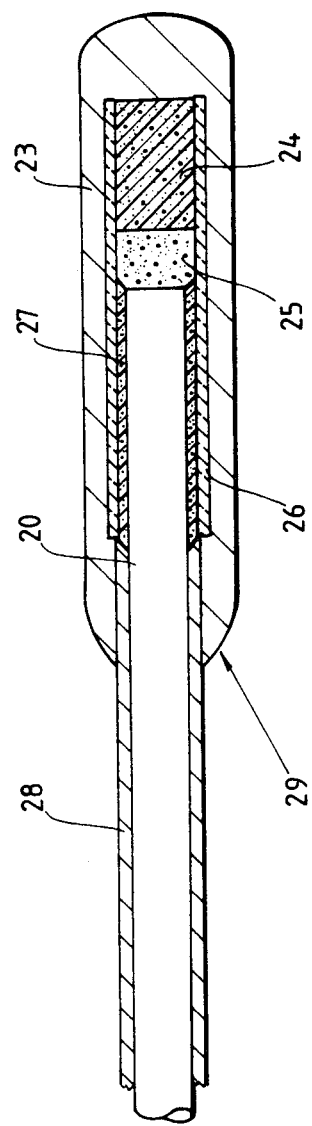
FIG. 3 shows an alternative construction of a probe utilizing a glass tube used in the system.
Figure 4:
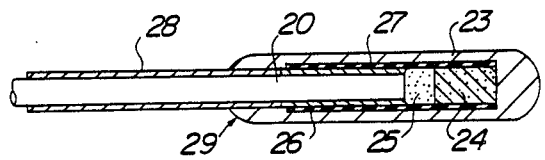
FIG. 4 shows a view analogous to FIG. 3 but of a probe utilizing a plastic tube.
Figure 5:
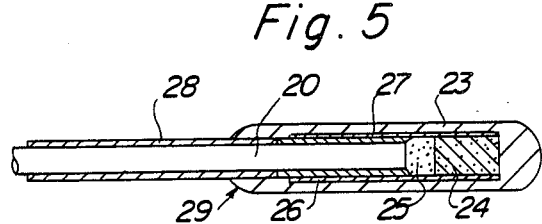
FIG. 5 shows a view analogous to FIG. 3 but of a probe utilizing a ceramic tube.

Alternatively the probe may, for example, be constructed as shown in FIGS. 3, 4 and 5. Part of the cabling 28 covering the optical fibre 20 is removed. The exposed fibre 20 is then sealed within a glass capillary tube 26 using an epoxy resin 27 to hold it in position. A protective cap 23 covers the capillary tube 26 and part of the cabling 28. The phosphor 25 is held against the optical fibre 20 by a block of resin 24 which seals the end of the capillary tube 26.

Conveniently a plurality of probes 5 are located in different positions within the generator and connected to respective detector, signal processing and indicator circuits. A common means, as for example, a xenon flash lamp may, however, be used to feed light pulses into all the fibres.

To enable sensors inside the generator to be connected through the machine's outer wall suitable gastight bulkhead connectors are conveniently provided.

The indicator 22 may take any convenient form, and may actuate a warning device in the event that the temperature at a position occupied by a probe exceeds a predetermined value. Such a device may be arranged to give an audible and/or visual warning signal. The temperature readings may also be continuously recorded.

Figure 6:
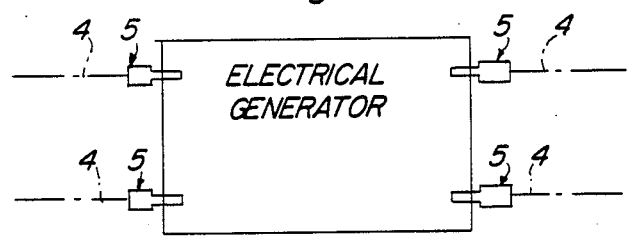
FIG. 6 shows an electrical generator with multiple probes.

Although the invention has particular application to the monitoring of temperatures in an electrical generator(see FIG. 6), it will be appreciated that it can be used to advantage to monitor temperatures in many other situations.

Moreover the construction of probe employed can be varied to suit any particular application of the invention.

For example the phosphor may be bonded to the end of the fibre or to a material which is itself attached to the fibre. For example the phosphor may be embedded in a glass which is cut to size and attached to the fibre end by a suitable bonding medium, which may be an epoxy or silicone resin. The probe may be encapsulated if desired, for example in a metal or plastic tube.

Modification in other parts of the measuring system may also be made. Thus, instead of utilising an analogue divider 14, a suitable analogue to digital converter may be employed together with a microprocessor for carrying out the division step. Such a microprocessor may also be arranged to carry out other functions, possibly including certain control measures.

I Claim:

1. A temperature sensing and measuring system comprising at least one probe containing a phosphor having a luminescent decay time which is dependent upon the temperature of said phosphor; means for producing a pulse of radiation having a wavelength capable of exciting said phosphor to luminescence; at least one optical fibre for directing said radiation onto said phosphor and for directing the luminescent emission from said phosphor to a monitoring device capable of deriving a first electrical signal which varies with the degree of luminescence; means responsive to said pulse of radiation for deriving a second electrical signal having a value dependent upon the intensity of the pulse and for storing said second signal; means for integrating said first signal produced by said monitoring device over a predetermined time period for producing a third electrical signal having a value representing said integrated first signal and means for dividing said second signal by said third signal and for providing an output signal which is dependent on the result thereof.

2. A temperature sensing and measuring system as claimed in claim 1 wherein said phosphor is aluminum oxide powder doped with chromium.

3. A temperature sensing and measuring system as claimed in claim 1 wherein said means for producing a pulse of radiation is a xenon flash lamp.

4. A temperature sensing and measuring system as claimed in claim 1 wherein said means for producing a pulse of radiation is a light-emitting diode.

5. A temperature sensing and measuring system as claimed in claim 1 wherein the same at least one optical fibre is used to convey the pulse of radiation to the phosphor and to carry the emission from the phosphor.

6. A temperature sensing and measuring system as claimed in claim 1 wherein said probe consists of a tube, closed at one end and having an optical fibre sealed into the opposite end, the phosphor being located within the tube between the end of the fibre and the closed end of the tube.

7. A temperature sensing and measuring system as claimed in claim 6 wherein said tube is formed from metal.

8. A temperature sensing and measuring system as claimed in claim 6 wherein said tube is formed from glass.

9. A temperature sensing and measuring system as claimed in claim 6 wherein said tube is formed from plastics.

10. A temperature sensing and measuring system as claimed in claim 6 wherein said tube is formed from ceramic material.

11. A temperature sensing and measuring system as claimed in claim 1 wherein a plurality of probes with associated optical fibres sense the temperature at different locations.

12. A temperature sensing and measuring system as claimed in claim 11 wherein a common means for producing a pulse of radiation is capable of exciting the phosphor in each probe.

13. An electrical generator incorporating a temperature measuring system according to claim 1 provided with a plurality of said probes disposed in different positions in the generator.

* * * * *

UNITED STATES PATENT AND TRADEMARK OFFICE
CERTIFICATE OF CORRECTION

PATENT NO. : 4,776,827
DATED : October 11, 1988
INVENTOR(S) : Martin P. Greaves

It is certified that error appears in the above-identified patent and that said Letters Patent is hereby corrected as shown below:

Col. 1:-
Line 61, change "Idt" to $-- \int_0^\infty Idt --$;

Line 65, change "$\frac{Io}{Idt}$" to $-- \int_0^\infty \frac{Io}{Idt} --$.

Signed and Sealed this

Twenty-fourth Day of July, 1990

Attest:

HARRY F. MANBECK, JR.

Attesting Officer

Commissioner of Patents and Trademarks